US006993571B2

(12) United States Patent
Kistler

(10) Patent No.: US 6,993,571 B2
(45) Date of Patent: Jan. 31, 2006

(54) POWER CONSERVATION IN A SERVER CLUSTER

(75) Inventor: Michael David Kistler, Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 822 days.

(21) Appl. No.: 09/931,290

(22) Filed: Aug. 16, 2001

(65) Prior Publication Data

US 2003/0037268 A1   Feb. 20, 2003

(51) Int. Cl.
G06F 15/16 (2006.01)
G06F 1/32 (2006.01)

(52) U.S. Cl. ............... 709/218; 709/218; 709/219; 713/320; 713/324

(58) Field of Classification Search ............ 713/300, 713/310, 320; 395/200; 709/216, 218, 219; 718/105
See application file for complete search history.

(56) References Cited

U.S. PATENT DOCUMENTS

| | | | | |
|---|---|---|---|---|
| 4,578,774 | A * | 3/1986 | Muller ................. | 713/324 |
| 5,613,071 | A * | 3/1997 | Rankin et al. .......... | 707/10 |
| 5,692,197 | A * | 11/1997 | Narad et al. ........... | 713/323 |
| 2002/0049918 | A1 * | 4/2002 | Kaxiras et al. ......... | 713/300 |
| 2002/0091826 | A1 * | 7/2002 | Comeau et al. ......... | 709/226 |
| 2002/0107935 | A1 * | 8/2002 | Lowery et al. ......... | 709/216 |
| 2002/0116583 | A1 * | 8/2002 | Copeland et al. ....... | 711/133 |
| 2002/0184403 | A1 * | 12/2002 | Dahlin et al. .......... | 709/316 |
| 2004/0174814 | A1 * | 9/2004 | Futral .................. | 370/231 |

* cited by examiner

*Primary Examiner*—Rupal Dharia
*Assistant Examiner*—Djenane Bayard
(74) *Attorney, Agent, or Firm*—Joseph P. Lally; Casimer K. Salys

(57) ABSTRACT

A system and method for operating a server cluster that includes a set of server devices connected to a local area network (LAN). Each server device maintains a directory of the contents of its file cache. When a decrease in server cluster traffic is detected, a server device on the server cluster is selected for powering down. Prior to powering down a server device, the device's file cache directory is broadcast over the LAN to each of the other server devices on the cluster. If a subsequent request for a file stored in the powered-down server's file cache is received by the cluster, the request is routed to one of the remaining active server devices. This server device then retrieves the requested file from the powered-down server's file cache over the LAN. Prior to broadcasting the file cache directory, pending client requests on the selected server device are completed. The powered-down server may continue to provide power to its NIC and system memory while the processor is deactivated. The server device NIC may include direct memory access capability enabling the NIC to retrieve files from the system memory while the processor is powered-down.

17 Claims, 5 Drawing Sheets

POWER CONSERVATION IN A SERVER CLUSTER

BACKGROUND

1. Field of the Present Invention

The present invention relates generally to the field of data processing networks and more particularly to a server cluster and method in which cached files on powered-down servers remain accessible to the active servers to conserve power consumption without substantially impacting response performance.

2. History of Related Art

In the field of network computing, network services are frequently provided using a server cluster in which multiple server services are connected together in a local area network configuration. Referring to FIG. 2, a conceptualized illustration of an example in which Web based services are provided by a server cluster 118 is presented. Server cluster 118 includes a set of servers 120–123 connected together in a local area network. Server cluster 118 may be configured such that a single universal resource indicator is serviced by any of the servers in the cluster. In other words, clients use a single network address when directing requests to the cluster, and any client request can be serviced by any of the servers in the cluster. In this illustration, a series of client requests, each indicated by a letter in reference numeral 119, are received by server cluster 118. Each letter in the series corresponds to the target file of the respective request. Each letter might, for example, identify a unique universal resource locator (URL). The series of requests 119 may include multiple requests for the same target file. The target file corresponding to letter "A," for example, has been requested twice in the illustrated series.

The server cluster 118 includes a request distributor 126 that implements locality aware request distribution (LARD). In a LARD configuration, client requests are routed to respective servers based at least in part on the requested target file. Routing requests in this manner attempts to distribute loading over the servers and to maximize efficiency by sending requests to the server that most recently serviced a request for a specific target file. In the illustrated example, requests for target files A and E are routed to server 120, requests for target files B and F are routed to server 121, requests for target files C and G have been routed to server 122, and requests for target files D and H have been routed to server 123.

Each server is shown as including a disk cache or file cache 124. File cache 124 typically comprises a portion of the respective server's volatile system memory and includes files or other data objects recently retrieved from disk storage 125. Thus, the file cache 124 of server 120 is shown as including requested files A and E while file cache 124 of server 121 includes requested files B and F and so forth. Data stored in file caches 124, of course, is retrieved faster than data stored in disk storage 125.

While distributing requests across multiple servers in a server cluster may provide performance advantages, it may also increase operating costs. The power consumed by each active server in a server cluster has motivated cluster designs in which servers are dynamically powered-down in response to the varying loads of client requests. At times when request loading is low, fewer servers are required to handle the client requests with adequate response performance while, at peaks loads, all servers may be required to deliver acceptable performance.

The advantages offered by LARD may, unfortunately, be inconsistent with the advantages offered by dynamic power loading. More specifically, by dynamically powering down servers to account for reduced loading, a server cluster may negatively impact performance by powering down one or more servers that contain cached copies of recently requested target files. Referring to FIG. 3, an illustration of the performance penalty that occurs when a one or more servers is powered-down in a LARD configured server cluster is presented. In this illustration, servers 120 and 121 have been powered-down by the server cluster in an effort to conserve power during a time of reduced traffic. Prior to power-down, server 120 had been servicing requests for target files A and E (as in FIG. 2) and server 121 had been servicing requests for target files B and F. Accordingly, the file caches 124 of the remaining active servers 122 and 123 do not contain cached copies of target files A, E, B, and F. When a subsequent request for any of these target files is received, the server cluster must direct the request to one of the active servers. Because the file caches of the active servers do not include copies of target files A, B, E, and F, subsequent requests for these files have to be serviced from disk storage 125. It would be desirable to implement a server cluster that benefited from dynamic activation of servers and locality aware request distribution without suffering the disk access performance penalty described above.

SUMMARY OF THE INVENTION

The problems identified above are addressed by a data processing system and method in which servers on a server cluster are selectively deactivated based upon loading or some other parameter. A server is deactivated by completing any pending client requests and then transitioning the server's processor(s) to a low power state. The deactivated server continues to provide power to its system memory and network interface card. Prior to deactivation, a server enables the other servers to access its file cache, such as by broadcasting a directory of its disk cache or file cache to other servers on the network. The network interface cards are configured with direct memory access capability. While a server is deactivated, the remaining active servers on the network may access files or other data objects within the deactivated server's file cache over the network through the deactivated server's network interface card.

BRIEF DESCRIPTION OF THE DRAWINGS

Other objects and advantages of the invention will become apparent upon reading the following detailed description and upon reference to the accompanying drawings in which.

Figure 1:
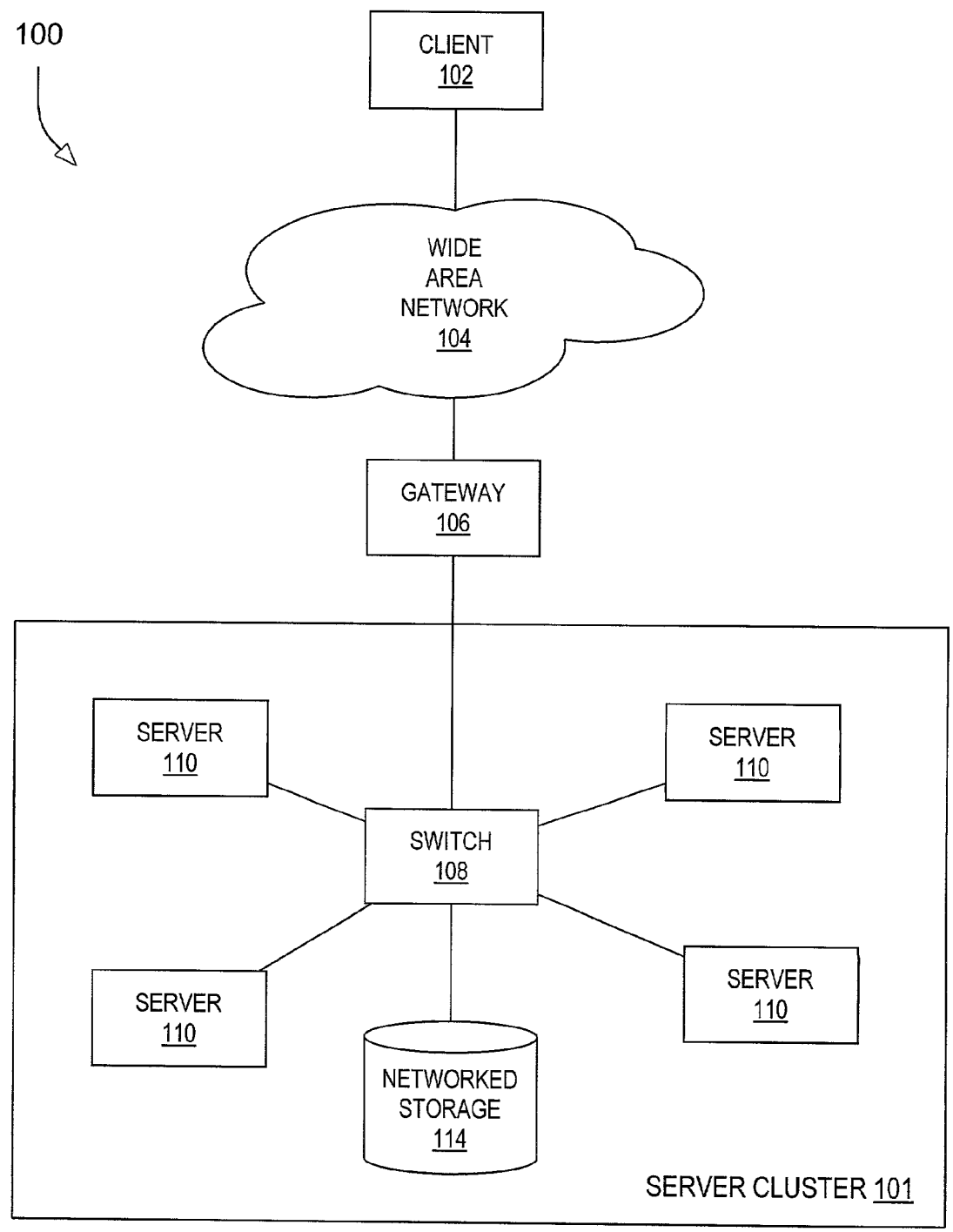
FIG. 1 is a block diagram of selected elements of a data processing network according to one embodiment of the present invention.
Figure 2:
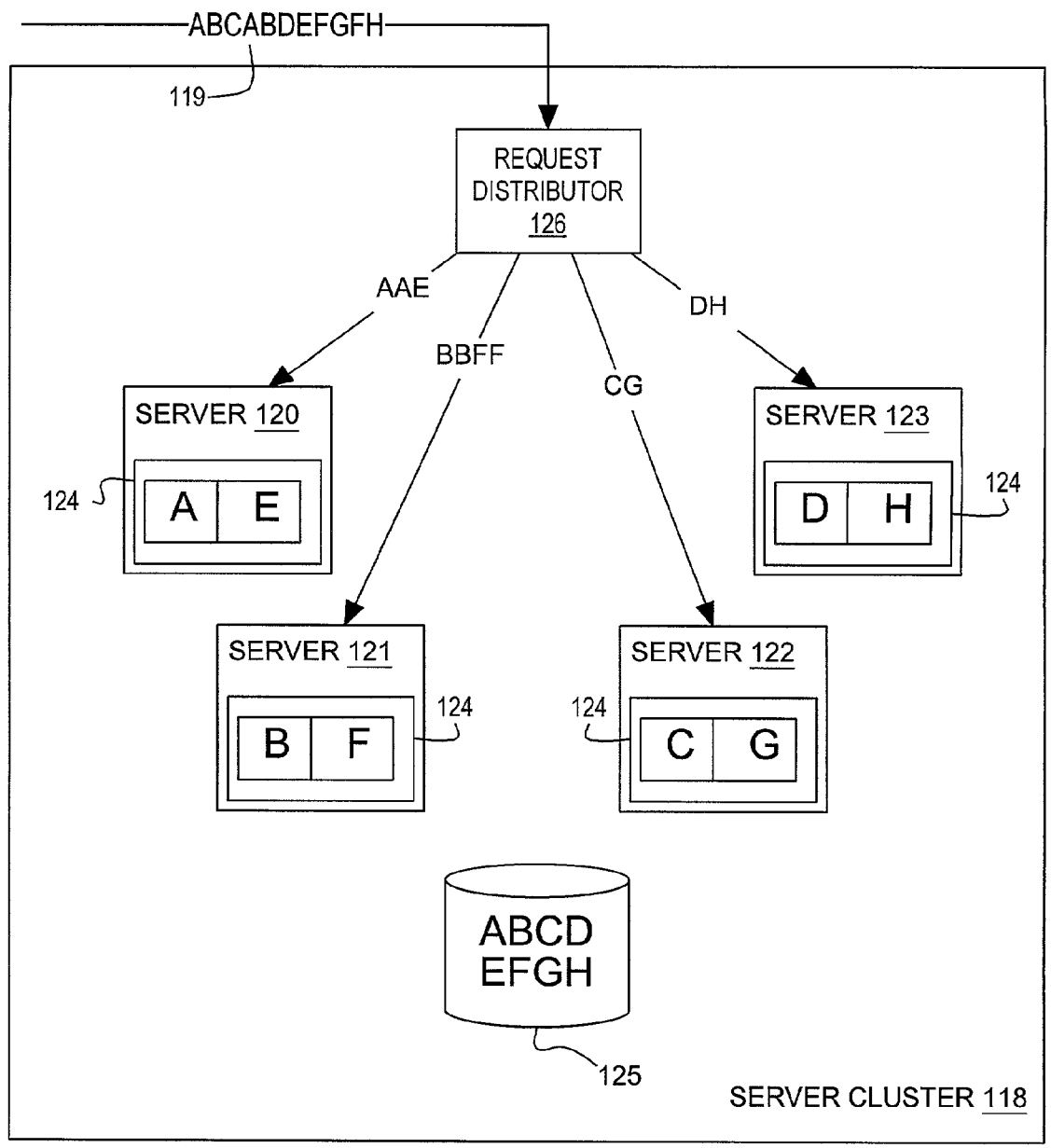
FIG. 2 is a conceptualized illustration of a server cluster employing locality aware request distribution.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Generally speaking the invention contemplates a server cluster and method of operation in which the servers on the cluster may be selectively powered-down or deactivated to reduce energy consumption. When a server is powered up or active, direct memory accesses to the server's memory from other servers on the cluster are prevented. After a server is deactivated, the complete contents of the deactivated server's file cache are available to other servers on the cluster. Before a server is deactivated, it may broadcast a directory of its file cache to the other servers in the cluster. When a server deactivates, it transitions its processor or processors to a low power state while maintaining power to its network interface card and system memory. After the server is deactivated, client requests to files or other data objects in the deactivated server's file cache may be processed by an active server. The active server assigned to handle the request may retrieve the file from deactivated server's memory over the network thereby avoiding a time consuming retrieval of data from disk. In this manner, a server cluster can implement a selective power down scheme without substantially degrading performance.

Turning now to the drawings, FIG. 1 depicts selected features of a data processing network 100 according to one embodiment of the invention. In the depicted embodiment, network 100 includes a client 102 connected to a wide area network 104. Client 102 typically includes a client application program such as a conventional web browser that is executing on a client device. The client device may comprise a desktop or laptop personal computer, a network computer or workstation, or another network aware device such as a personal digital assistant (PDA) or an Internet enabled phone. Although client 102 is illustrated as remotely connected to server network 101 through the intervening WAN 104, other clients (not depicted in FIG. 1) may comprise a device on the server network itself.

Wide area network 104 typically includes various network devices such as gateways, routers, hub, and one or more local area networks (LANs) that are interconnected with various media possibly including copper wire, coaxial cables, fiber optic cables, and wireless media. Wide area network 104 may represent or include portions of the Internet.

In the depicted embodiment, a server network or server cluster 101 is connected to client 102 through a gateway 106 connected to wide area network 104. Server cluster 101 is typically implemented as a LAN that includes one or more servers 110 (four of which are shown). The servers 110 may be networked together over a shared medium such as in a typical Ethernet or Token ring configuration. The depicted embodiment of server cluster 101 is implemented as a switched or point-to-point network in which each server 110 is connected to a switch 108 that is capable of providing a dedicated connection between any pair of servers 110.

The servers 110 of server cluster require access to a persistent (non-volatile) storage medium such as a magnetic hard disk. Any server 110 may include its own internal disk and disk drive facilities. In an increasingly prevalent configuration, persistent storage is provided as a networked device or set of devices. Networked storage is identified in FIG. 1 by reference numeral 114 and may be implemented as one or more network attached storage (NAS) devices, a storage area network (SAN) or a combination thereof.

Figure 4:
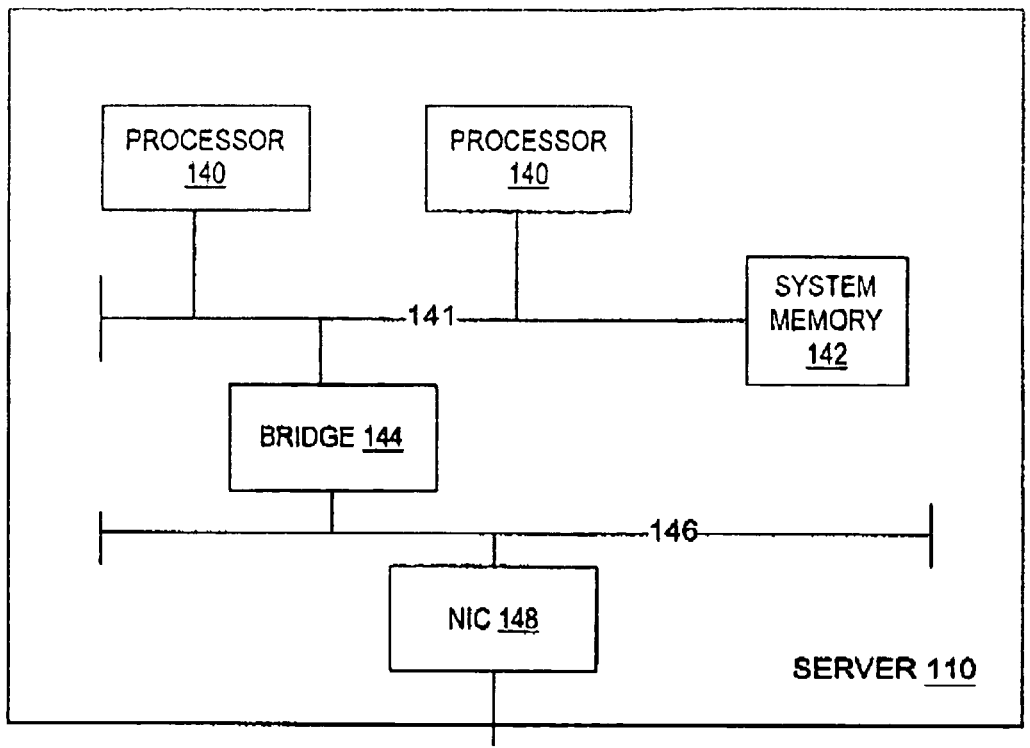
FIG. 4 is a block diagram of selected features of a server according to one embodiment of the invention.

Referring now to FIG. 4, a block diagram of selected elements of server 110 are depicted. Server 110 includes one or more processors 140 that can access a system memory 142 via a system bus 141. Processors 140 are commercially distributed general purpose microprocessors such as the PowerPC® family of processors from IBM Corporation or an x86-type processor such as the Pentium® family of processors from Intel Corporation. A bus bridge 144 connects system bus 141 to a peripheral bus 146. The peripheral bus is typically implemented as a Peripheral Components Interface (PCI) compliant bus to which one or more PCI compliant peripheral devices may be connected. In the depicted embodiment, a network interface card (NIC) 148 connected to peripheral bus 146 provides a connection between server 110 and an external network such as the local area network of server cluster 101. NIC 148 is configured with direct memory access capability that enables it to access the system memory 142 of server 110 without invoking or requiring the assistance of processor 140. In addition, server 110 is enabled to power down the processor(s) 140 without powering off NIC 148 or system memory 142.

Figure 5:
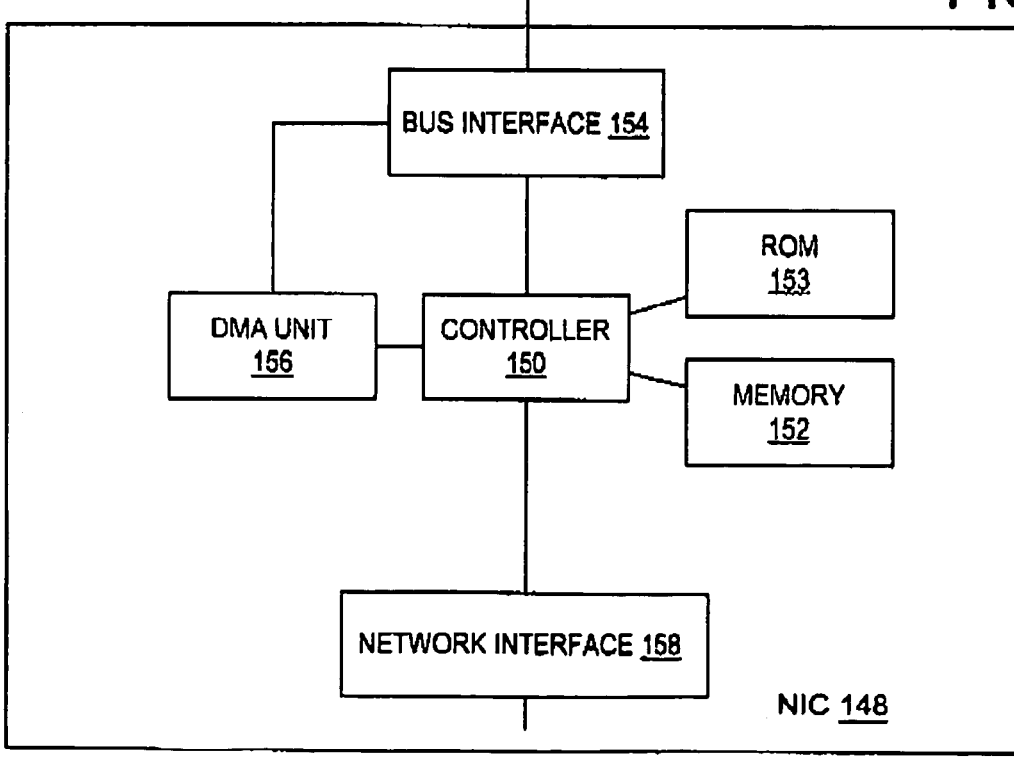
FIG. 5 is a block diagram of selected features of a network interface card according to one embodiment of the invention.

Referring to FIG. 5, selected elements of the NIC 148 according to one embodiment of the invention are depicted. In the depicted embodiment, NIC 148 includes an embedded controller 150 that can access a local memory 152 and a read only memory (ROM) element 153. NIC 148 further includes a DMA unit 156 connected to controller 150. Portions of the invention and NIC 148 may be implemented as a set of computer executable instructions (software) stored on a computer readable medium such as ROM 153. ROM 153 may comprise a flash memory card or an electrically erasable programmable ROM (EEPROM).

Controller 150 is connected to a network interface unit 158 that provides buffering and buffering logic between the server cluster network and controller. Similarly, a peripheral bus interface unit 154 provides appropriate buffering between NIC controller 150 and peripheral bus 146. DMA unit 156 includes a set of DMA registers that are under the programmable control of controller 150. These registers may include a DMA command register for controlling DMA configuration parameters such as the active level of DMA request and acknowledge signals, a DMA mode register defining the DMA transfer mode, address increment/decrement setting, and other DMA mode attributes, a status register indicating whether a DMA request is pending, and one or more DMA address registers. When NIC 148 is instructed to initiate a DMA cycle, controller 150 sets the registers in DMA unit including the address register(s). Controller 150 may then instruct DMA unit 156 to execute the DMA cycle and DMA unit 156 responds by retrieving data from system memory 142 at the address defined by the address registers.

Server cluster 101 is implemented with a power management capability that monitors the server cluster loading and dynamically adjusts the number of servers 110 that are active at any time based on the loading. When the server cluster traffic is low, fewer servers are required to be active. Thus, server cluster 101 may de-activate one or more servers 110 in response to low levels of network traffic. In one embodiment of the invention, server cluster 101 de-activates a server 110 by transitioning the server's processor(s) to a low power state. Commercially distributed microprocessors typically include software commands or resets that transition the processor into a reduced power consumption state. Such states may be referred to as sleep mode, standby mode, and a variety of other terms. In any of these low power states, the processors 140 draw substantially less current than in the normal operating state.

When server cluster 101 determines that cluster traffic justifies the deactivation of one or more servers 110, the server(s) 110 selected for de-activation are transitioned to a power state in which the processors 140 are in a low power state while power remains supplied to NIC 148, bus bridge 144, peripheral bus 146, system bus 141, and system memory 144. Server cluster 101 may send a message to a server 110 informing the server that has been selected for deactivation.

When a server 110 is selected for de-activation, the server will first complete any active requests that are pending. Upon completing any pending requests, a server selected for deactivation places its processors 140 into low power state. The selected server remains in this state until it is instructed to return to full power by the request distributor 126.

Each server 110 on server cluster 101 may implement a simple protocol that prevents other servers from accessing the contents of its memory when it is powered up, but allows the other servers to access the contents of its file cache when it is deactivated. In one embodiment, a selected server 110 may broadcast to each server 110 in server cluster 101 a directory of the server's file cache. Each server 110 that receives such a broadcast message will store the received directory in its memory. After a server 110 has broadcast its file cache directory to the server cluster, the server may enter a low power state by issuing an appropriate command or interrupt to the server's processor 140. If server 110 is subsequently instructed to return to fill power, it first broadcasts to each server 110 in server cluster 101 a message revoking access to its file cache. When each server 110 has acknowledged receipt of this message, server 110 can begin accepting and processing new client requests.

After a server 110 has been deactivated, client requests are no longer routed to the server. If another server, however, receives a client request for a file or other data object that was in the file cache of a de-activated server, the server 110 receiving the request will determine from its copy of the de-activated server's file cache directory that the de-activated server's system memory has a copy of the requested file. The server 110 processing the client request will then send a message to the de-activated server to retrieve the requested file. The de-activated server's NIC 148 will then perform a DMA retrieval of the requested file and forward it back to the server handling the request.

Figure 3:
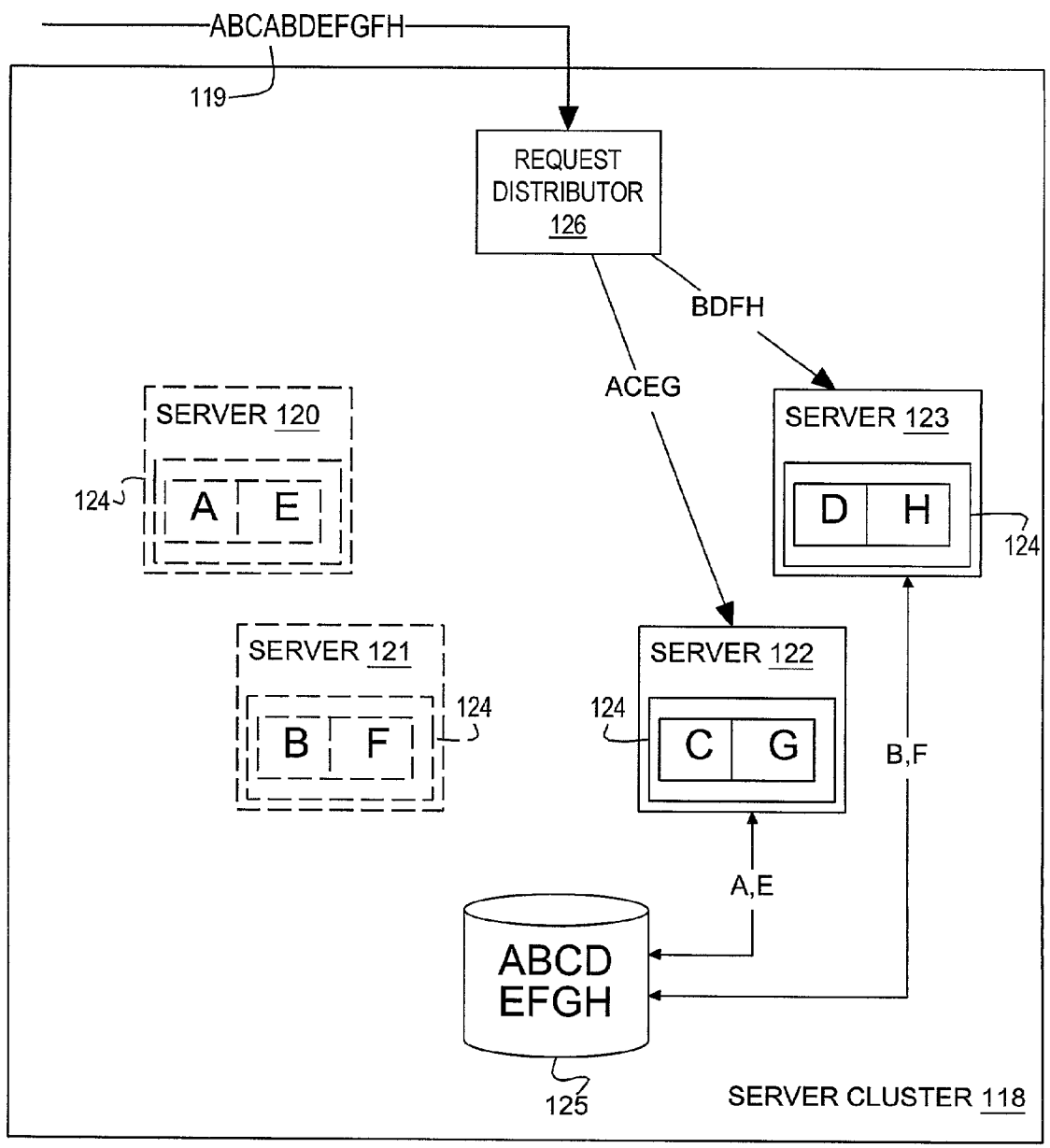
FIG. 3 is a conceptualized depiction of the server cluster of FIG. 2 illustrating operation of the cluster after one or more servers have been powered-down to conserve energy.
Figure 6:
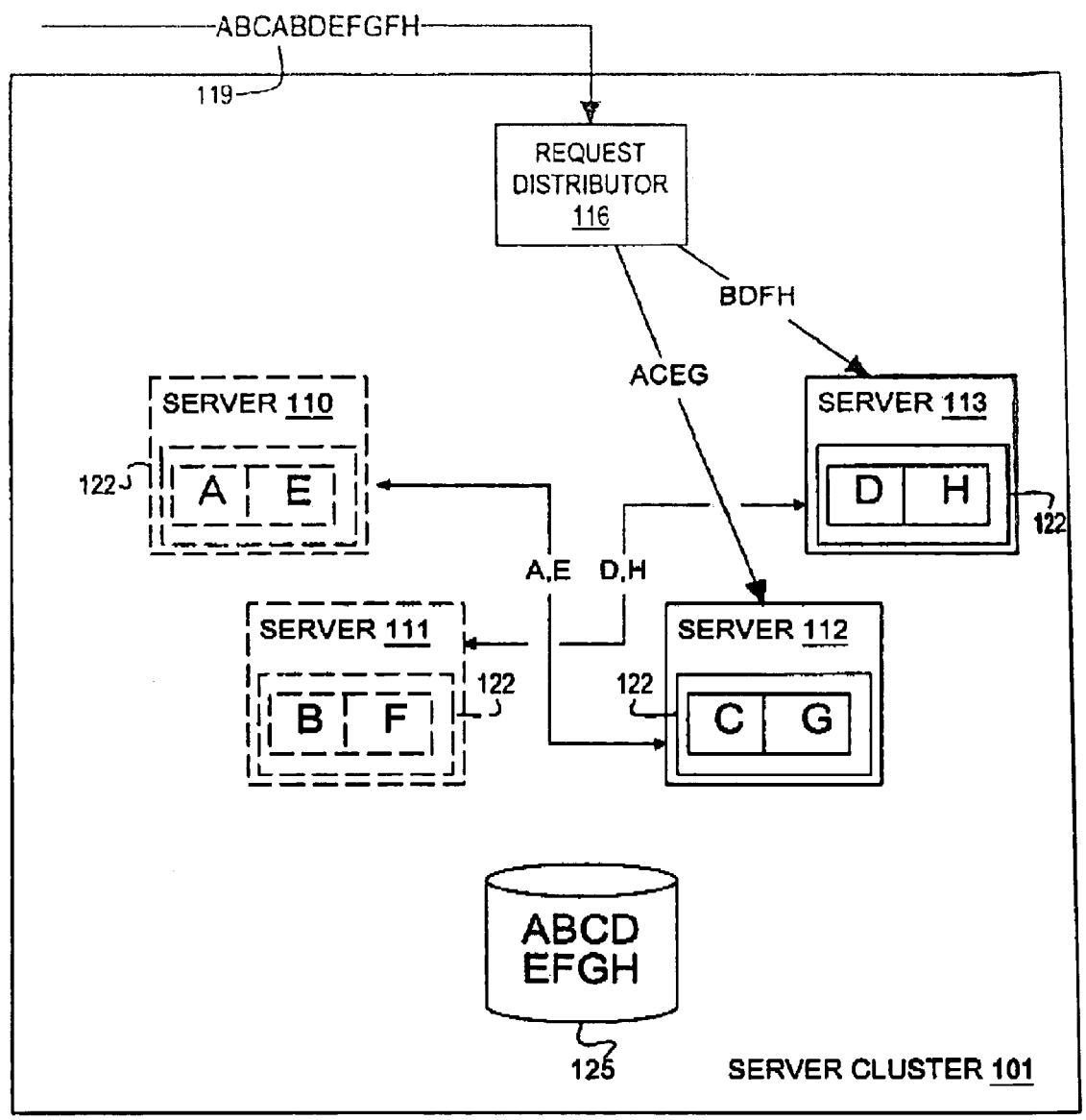
FIG. 6 is a conceptualized depiction illustrating operation of a server cluster according to the present invention.

Referring to FIG. 6, operation of an embodiment of server cluster 101 is illustrated in a conceptualized format analogous to the illustration of the operation of the conventional server cluster 118 presented in FIG. 3. Similar to FIG. 3, FIG. 6 depicts a series of clients requests that are received by server cluster 101. Server cluster 101 includes a request distributor 116 analogous to request distributor 126 of server cluster 118 that forwards each of the received requests to a server in the cluster. As depicted in FIG. 6, server 110 has been deactivated at a time when target files A and E are in its file cache 122 while server 111 has been deactivated at a time when target files B and F are in its file cache 122. Prior to deactivation, directories of these file caches have been broadcast to servers 112 and 113. When a subsequent request for a target file contained in the file caches 122 of deactivated servers 110 or server 111 are received by server cluster 101 and routed by request distributor 116 to one of the remaining active servers (112 or 113), the active server handling the request retrieves the requested target files front the system memory of the appropriate deactivated server using the DMA capability of the deactivated server's NIC. In this manner, response performance is improved by reducing accesses to disk storage 125. Thus, FIG. 6 illustrates a retrieval of target files A and E by server 112 from file cache 122 of deactivated server 110 and a retrieval of target files B and F by server 113 from file cache 122 of deactivated server 111. This DMA retrieval of files from the system memories of deactivated servers on the cluster is contrasted to the retrieval of requested files from disk storage as depicted in FIG. 3 when a requested file resides in the file cache of a deactivated server.

It will be apparent to those skilled in the art having the benefit of this disclosure that the present invention contemplates a method of implementing a power managed server cluster without unnecessarily increasing the number of data accesses to disk storage. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of operating a server cluster including a set of server devices each connected to a local area network, comprising:

preventing access to a selected server's memory by other servers on the server cluster when the selected server is powered up;

deactivating the selected server responsive to a decrease in server cluster traffic;

responsive to deactivating the selected server, permitting the other servers on the cluster to access at least a portion of the selected sewer's memory; and responsive to a request received by one of the other servers for a file stored in the selected server's file cache, retrieving the file from the selected server's file cache over the local area network.

2. The method of claim 1, wherein permitting the other servers to access at least a portion of the selected server's memory includes broadcasting a directory of the selected server's file cache contents to the other servers before powering down the selected server.

3. The method of claim 2, further comprising, prior to powering down the selected server, processing any pending client requests on the selected server.

4. The method of claim 1, further comprising, responsive to an increase in network traffic:

broadcasting a message to each of the other server devices on the server cluster that the selected server is to be activated;

responsive to the activation message, preventing the other servers from accessing the system memory of the selected server; and activating the selected server.

5. The method of claim 4, wherein preventing the other servers from accessing the system memory of the selected server includes deleting a directory of the selected server's file cache contents from the memories of the other servers.

6. The method of claim 1, wherein retrieving the file from the selected server's file cache includes initiating a direct memory access of the selected server's system memory from the selected server's NIC.

7. A server device suitable for use in a data processing network comprising:
- at least one processor;
- a system memory accessible to the processor via a system bus;
- a network interface card (NIC), including a NIC controller and memory, connected to the system bus and providing a connection to the local area network;
- server code means for deactivating the processor;
- NIC code means for preventing access to the server device's memory by other servers on the server cluster when the server device is activated; and
- NIC code means for enabling the other servers to retrieve a file from the system memory of the server device when the server device is deactivated.

8. The server of claim 7, wherein the code means for enabling the other servers to retrieve a file from the server device includes code means for broadcasting a directory of the server device's file cache contents prior to deactivation.

9. The server of claim 7, wherein the NIC is configured to access the server system memory directly without invoking the server processor.

10. The server of claim 7, wherein the NIC is a PCI compliant NIC.

11. A data processing network including a set of interconnected server devices, each server device comprising:
- at least one processor;
- a system memory accessible to the processor via a system bus;
- a network interface card (NIC), including a NIC controller and memory, connected to the system bus and providing a connection to the local area network;
- server code means for deactivating the processor;
- NIC code means for preventing access to the server device's memory by other servers on the server cluster when the server device is activated; and
- NIC code means for enabling the other servers to retrieve a file from the system memory of the server device when the server device is deactivated.

12. The network of claim 11, wherein the code means for enabling the other servers to retrieve a file from the server device includes code means for broadcasting a directory of the server device's file cache contents prior to deactivation.

13. The network of claim 11, wherein the NIC is configured to access the server system memory directly without invoking the server processor.

14. The network of claim 11, wherein the NIC is a PCI compliant NIC.

15. The network of claim 11, further comprising network code means for dynamically adjusting the number of deactivated servers in the network responsive to variations in network traffic.

16. The network of claim 15, further comprising network code means for directing client to servers of the network based at least in part on the requested content.

17. The network of claim 11, wherein each of the server devices includes code means for retrieving a requested file from the file cache of a deactivated server on the server cluster responsive to determining that the requested file is in the deactivated server's file cache.

* * * * *

UNITED STATES PATENT AND TRADEMARK OFFICE
CERTIFICATE OF CORRECTION

PATENT NO.         : 6,993,571 B2
APPLICATION NO. : 09/931290
DATED                 : January 31, 2006
INVENTOR(S)       : Michael David Kistler It is certified that error appears in the above-identified patent and that said Letters Patent is hereby corrected as shown below:

Claims:

Column 6, lines 31-45 should read
 1. A method of operating a server cluster including a set of server devices each connected to a local area network, comprising:

>   preventing access to a selected server's memory by other servers on the server cluster when the selected server is powered up;

>   deactivating the selected server responsive to a decrease in server cluster traffic;

>   responsive to deactivating the selected server, permitting the other servers on the cluster to access at least a portion of the selected server's memory; and >   responsive to a request received by one of the other servers for a file stored in the selected server's file cache, retrieving the file from the selected server's file cache over the local area network, wherein deactivating the selected server includes transitioning the selected server's processors to a low power state while maintaining power to the selected server's NIC, peripheral bus and system memory.

Column 7, lines 20-23 should read
 8. A server device suitable for use in a data processing network comprising:

>   at least one processor;

>   a system memory accessible to the processor via a system bus;

>   a network interface card (NIC), including a NIC controller and memory, connected to the system bus and providing a connection to the local area network;

>   server code means for deactivating the processor;

>   NIC code means for preventing access to the server device's memory by other servers on the server cluster when the server device is activated; and

UNITED STATES PATENT AND TRADEMARK OFFICE
CERTIFICATE OF CORRECTION

PATENT NO. : 6,993,571 B2
APPLICATION NO. : 09/931290
DATED : January 31, 2006
INVENTOR(S) : Michael David Kistler It is certified that error appears in the above-identified patent and that said Letters Patent is hereby corrected as shown below:

> NIC code means for enabling the other servers to retrieve a file from the system memory of the server device when the server device is deactivated, wherein deactivating the server device includes transitioning the server device's processors to a low power state while maintaining power to the server device's NIC, peripheral bus and system memory.

Column 8, lines 15-17 should read
  13. A data processing network including a set of interconnected server devices, each server device comprising:

>  at least one processor;

>  a system memory accessible to the processor via a system bus;

>  a network interface card (NIC), including a NIC controller and memory, connected to the system bus and providing a connection to the local area network;

>  server code means for deactivating the processor;

>  NIC code means for preventing access to the server device's memory by other servers on the server cluster when the server device is activated; and

UNITED STATES PATENT AND TRADEMARK OFFICE
CERTIFICATE OF CORRECTION

| | |
|---|---|
| PATENT NO. | : 6,993,571 B2 |
| APPLICATION NO. | : 09/931290 |
| DATED | : January 31, 2006 |
| INVENTOR(S) | : Michael David Kistler |

It is certified that error appears in the above-identified patent and that said Letters Patent is hereby corrected as shown below:

NIC code means for enabling the other servers to retrieve a file from the system memory of the server device when the server device is deactivated, wherein deactivating the server device includes transitioning the server device's processors to a low power state while maintaining power to the server device's NIC, peripheral bus and system memory.

Signed and Sealed this

Twenty-ninth Day of January, 2008

JON W. DUDAS
*Director of the United States Patent and Trademark Office*